United States Patent [19]
Ohnishi

[11] Patent Number: 6,075,567
[45] Date of Patent: Jun. 13, 2000

[54] IMAGE CODE TRANSFORM SYSTEM FOR SEPARATING CODED SEQUENCES OF SMALL SCREEN MOVING IMAGE SIGNALS OF LARGE SCREEN FROM CODED SEQUENCE CORRESPONDING TO DATA COMPRESSION OF LARGE SCREEN MOVING IMAGE SIGNAL

[75] Inventor: Osamu Ohnishi, Tokyo, Japan

[73] Assignee: NEC Corporation, Tokyo, Japan

[21] Appl. No.: 08/797,120

[22] Filed: Feb. 10, 1997

[30]   Foreign Application Priority Data

Feb. 8, 1996  [JP]  Japan .................................... 8-022296

[51] Int. Cl.⁷ .............................. H04N 7/18; H04N 5/66; H04N 5/225; H04N 5/445
[52] U.S. Cl. .......................... 348/383; 348/383; 348/153; 348/218; 348/564
[58] Field of Search ..................................... 348/218, 383, 348/385, 387, 153, 159, 564, 588, 700, 701, 838, 839, 840

[56]       References Cited
       U.S. PATENT DOCUMENTS 4,800,376  1/1989  Suga et al. ............................... 340/721
  5,459,514  10/1995  Sakamoto et al. ...................... 348/398
  5,633,683  5/1997  Rosengren et al. ..................... 348/385
  5,638,127  6/1997  Murakami et al. ..................... 348/412

*Primary Examiner*—John K. Peng
*Assistant Examiner*—Paulos M. Natnael
*Attorney, Agent, or Firm*—Foley & Lardner

[57]              ABSTRACT

An image code transform system for arranging and composing a plurality of small screens of moving images to a large screen image, compressing and encoding the large screen image to generate a large screen compressed/coded data sequence, and extracting small screen compressed/coded data sequences of the plurality of small screens of moving images from the large screen compressed/coded data sequence. The system includes a multiplexer for re-arranging frames of the plurality of small screen moving images at an identical time to generate a composite frame and generating a large screen moving image signal of the composite frame; a compressor/encoder for compressing and encoding the large screen moving image signal on a block basis to generate a large screen compressed/coded data sequence signal and for outputting the large screen compressed/coded data sequence signal, the block being obtained by dividing the large screen moving image signal; and a separator/converter for separating and converting a plurality of small screen compressed signals corresponding to the plurality of small screens directly from the large screen compressed/coded data sequence signal.

7 Claims, 4 Drawing Sheets

IMAGE CODE TRANSFORM SYSTEM FOR SEPARATING CODED SEQUENCES OF SMALL SCREEN MOVING IMAGE SIGNALS OF LARGE SCREEN FROM CODED SEQUENCE CORRESPONDING TO DATA COMPRESSION OF LARGE SCREEN MOVING IMAGE SIGNAL

BACKGROUND OF THE INVENTION

1. Field of the Invention

The present invention relates to image code transform systems which can arrange moving images of a plurality of small screens to generate a composite large screen image and obtains sequences of small screen coded data corresponding to compressed/encoded data of a plurality of small screens of moving images from a sequence of large screen compressed/coded data corresponding to compressed/encoded data of the composite large screen image and more particularly, to an image code transform system which can obtain desired small screen coded sequences while eliminating the need for expanding a large screen compressed signal.

2. Description of the Related Art

A conventional image data compression apparatus for subjecting a large screen signal created by composing small screen moving image signals to a data compressing operation, for the purpose of minimizing the hardware of an encoding/decoding system, does not respectively independently compress and encode moving images of a plurality of small screens but composes a plurality of moving image signals of the small screens into a single moving image signal of a large screen, and then subjects the large screen moving image signal to a collective compressing/encoding operation to thereby generate and output a coded sequence of large screen compressed/coded data.

In order to extract the compressed/coded data sequences of the small screen moving image signals from the compressed/coded data sequence of the large screen moving image signal thus subjected to the data compressing and encoding operation, a prior art image code transform apparatus first decodes and transforms the large screen compressed/coded data sequence again into the large screen moving image reproduction signal, then separates the large screen moving image reproduction signal into a plurality of small screen moving image reproduction signals, and then subjects the small screen moving image reproduction signals again to the compressing/coding operation to obtain desired small screen compressed/coded data sequences of the small screen moving image signals.

Explanation will next be made as to the above prior art by referring to FIG. 1. The prior art system comprises an image data compression device and an image code transform device.

As shown in FIG. 1, the image data compression device includes a plurality of TV cameras 1a, 1b, . . . ; a multiplexer (MUX) 92 for receiving small screen moving image signals a, b, . . . issued from these TV cameras, composing these small screen moving image signals into a large screen moving image signal, and outputting the large screen moving image signal; and a large screen encoder (ENC-L) 93 for subjecting the large screen moving image signal to a data compressing operation to generate a large screen compressed/coded data sequence and outputting the large screen compressed/coded data sequence. The image code transform device, on the other hand, includes a decoder (DEC) 94 for expanding the large screen compressed/coded data sequence to a large screen moving image reproduction signal; a demultiplexer (DMUX) 95 for dividing large screen moving image reproduction signal into small screen moving image reproduction signals and outputting them; and a plurality of small screen encoders (ENC-S) 9a, 9b, . . . for receiving the plurality of small screen moving image reproduction signals, subjecting the received small screen reproduction signals to a data compressing operation into small screen compressed/coded data sequences A', B', . . . and outputting the small screen compressed/coded data sequences respectively.

More specifically, the plurality of TV cameras 1a, 1b, . . . supply the small screen moving image signals a, b, . . . to the multiplexer (MUX) 92 respectively. The multiplexer (MUX) 92 composes the small screen moving image signals a, b, . . . into the single composite large screen moving image signal and outputs the composite image signal to the large screen encoder (ENC-L) 93. The large screen encoder (ENC-L) 93 subjects the large screen moving image signal received from the multiplexer (MUX) 92 to the compressing and encoding operations into the large screen compressed/coded data sequence for its output.

The decoder (DEC) 94 expands the large screen compressed/coded data sequence received from the large screen encoder (ENC-L) 93 to obtain the large screen moving image reproduction signal, and outputs the large screen moving image reproduction signal to the demultiplexer (DMUX) 95. The demultiplexer (DMUX) 95 in turn separates the large screen moving image reproduction signal received from the decoder (DEC) 94 into the small screen moving image reproduction signals corresponding to the original small screens, and then supplies the separated small screen moving image reproduction signals to the respective small screen encoders (ENC-S) 9a, 9b, . . . . The encoders 9a, 9b, . . . subject the small screen moving image reproduction signals to the compressing and encoding operations to output the small screen compressed/coded data sequences A', B', . . . , respectively.

The aforementioned prior art image code transform system repeats the compressing and encoding operations of the moving image signals twice. This prior art, even if repeating the compressing and encoding process, will not involve any image quality problem, so long as it employs the information-preserving data compression method as its data compression/coding/decoding system. When the prior art employs such a non-information-preserving data compression method as a discrete cosine transform (DCT) which involves real number computation in the coding/decoding process, however, an error takes place in the coding and decoding process and such error is accumulated through such process repetition, thus inevitably resulting in reduction of its image quality. Further, in the prior art system, since the repetitive decoding and coding operations require the decoder and the plurality of encoders associated with the plurality of small screens, this inevitably requires a complex system arrangement.

SUMMARY OF THE INVENTION

It is therefore an object of the present invention to provide an image code transform system which can avoid repetitive decoding and coding operations of a large screen compressed/coded image signal to keep a high quality of image and can obtain compressed signals corresponding to a plurality of small screens.

Another object of the present invention is to provide an image code transform system which can extract small screen compressed/coded data sequences associated respectively with a plurality of small screen moving images from a large screen compressed/coded data sequence, with a simplified system arrangement.

In accordance with an aspect the present invention, there is provided an image code transform system which comprises, as its basic constituent elements, a multiplexer for re-arranging frames of the plurality of small screen moving images at an identical time to generate a composite frame and generating a large screen moving image signal of the composite frame;

a compressor/encoder for compressing and encoding the large screen moving image signal on a block basis to generate a large screen compressed/coded data sequence signal and for outputting the large screen compressed/coded data sequence signal, the block being obtained by dividing the large screen moving image signal; and a separator/converter for separating and converting a plurality of small screen compressed signals corresponding to the plurality of small screens directly from the large screen compressed/coded data sequence signal.

In the present invention, in the case where the compressor/encoder is a motion-compensation interframe encoder, when such a motion vector occurs as to refer to the adjacent small screen, the motion-compensation interframe encoder forcibly sets a value of the motion vector at zero.

In the present invention, further, the multiplexer arranges frames of moving images of the plurality of small screens, places a high-contrast signal pattern at boundaries of the small screens on the block basis to generate a large screen image, and outputs the large screen image to the compressor/encoder.

In the invention, furthermore, the multiplexer arranges frames of moving images of the plurality of small screens, places either one of fully white and fully black lines at boundaries of the small screens to generate a large screen image, and outputs the large screen image to the compressor/encoder.

In the invention, the multiplexer arranges frames of moving images of the plurality of small screens, places a pattern of white and black lines at boundaries of the small screens on the block basis to generate a large screen image, and outputs the large screen image to the compressor/encoder.

BRIEF DESCRIPTION OF THE DRAWINGS

The above and other objects, features and advantages of the present invention will become apparent from the following detailed description when taken with the accompanying drawings in which.

DESCRIPTION OF THE PREFERRED EMBODIMENTS

An embodiment of the present invention will be explained with reference to the accompanying drawings.

Figure 1:
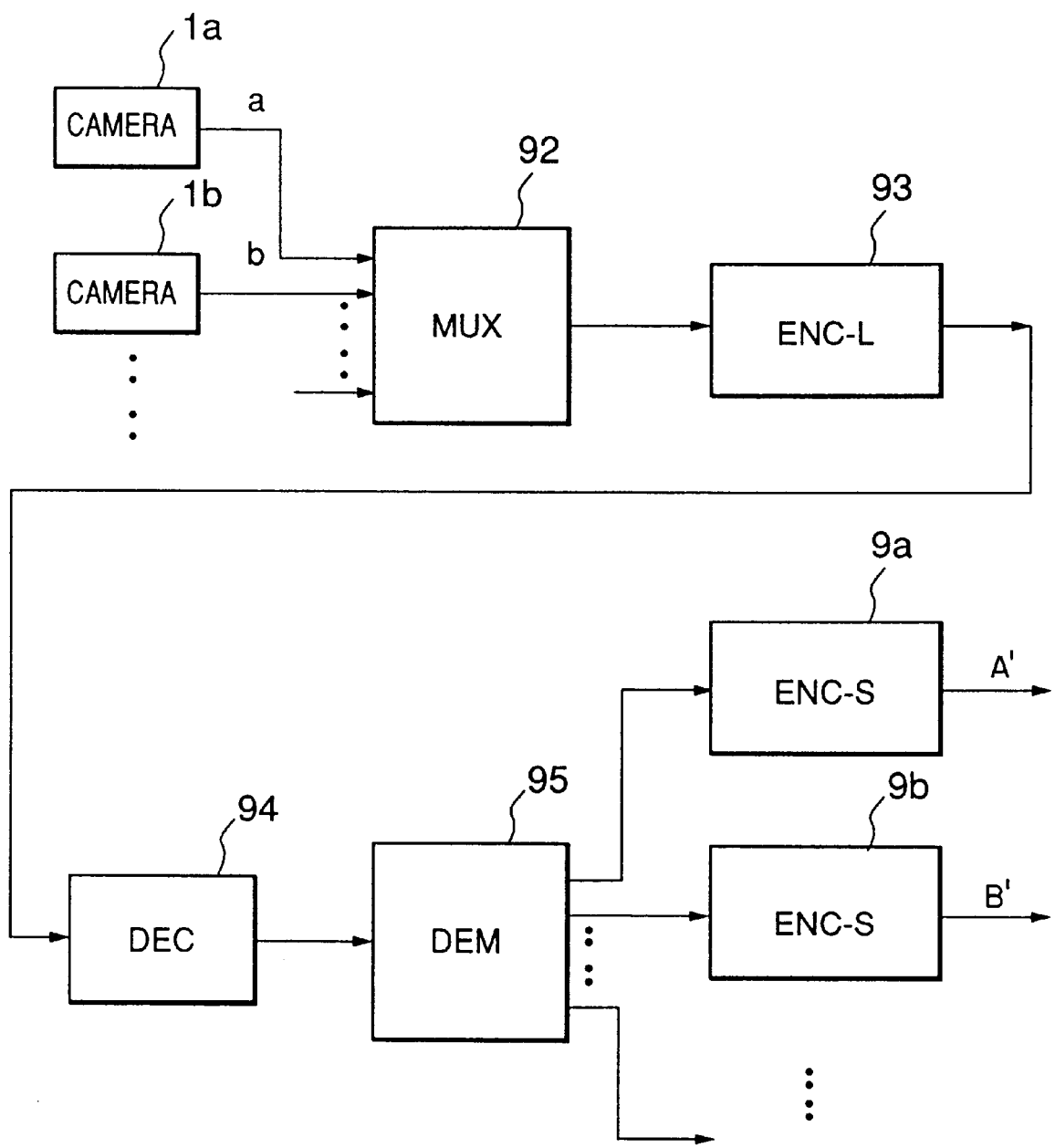
FIG. 1 is a block diagram of a prior art image code transform system.
Figure 2:
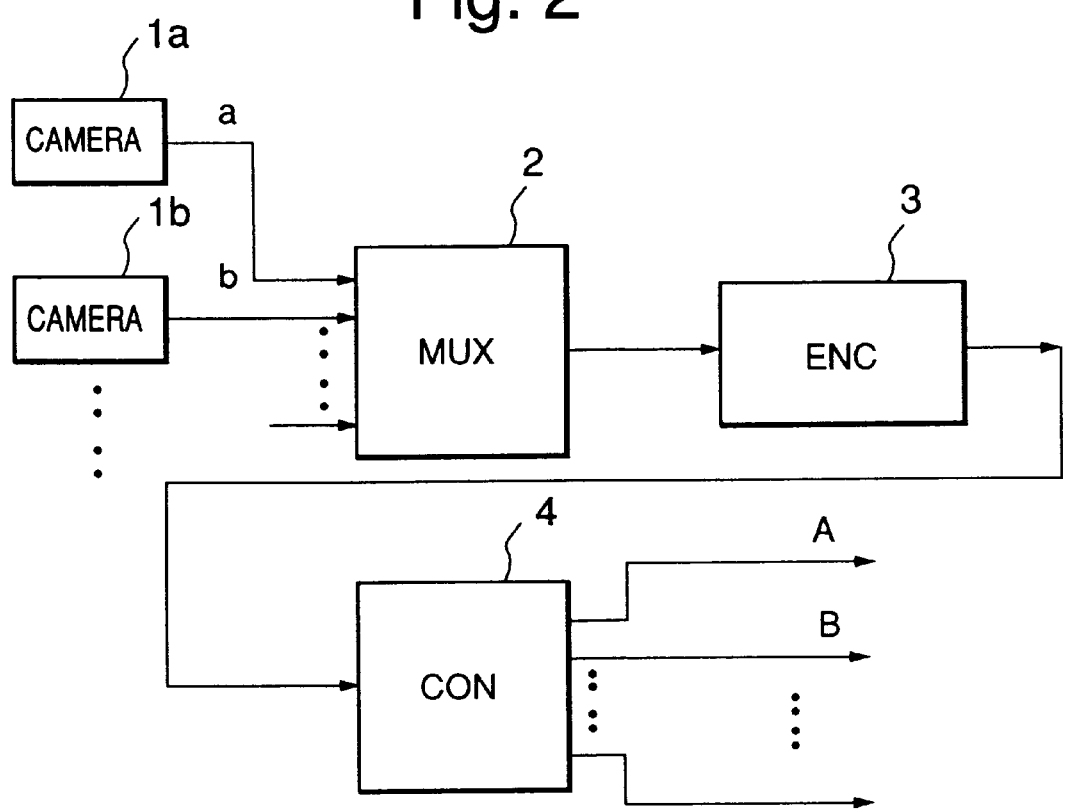
FIG. 2 is a block diagram of an image code transform system in accordance with an embodiment of the present invention.

Referring first to FIG. 2, there is shown a functional block diagram of an image code transform system in accordance with an embodiment of the present invention.

As shown in FIG. 2, the image code transform system of the present invention comprises a image composer or multiplexer (MUX) 2 for receiving small screen moving image signals a, b, . . . from a plurality of TV cameras 1a, 1b, . . . respectively, composing these small screen moving image signals into a large screen moving image signal, and outputting the large screen moving image signal; a large screen encoder (ENC-L) 3 for subjecting the large screen moving image signal to a data compressing operation to obtain a large screen compressed/coded data sequence, and outputting the large screen compressed/coded data sequence; and a separator/converter (CON) 4 for separating a plurality of small screen compressed signals A, B, . . . associated respectively with the plurality of small screens directly from the large screen compressed/coded data sequence.

Although the TV cameras 1a, 1b, . . . are illustrated as small screen moving image generation sources in FIG. 2, other signal sources such as video tape recorders (VTRs) may be employed so far as the sources can generate moving image signals.

Figure 3:
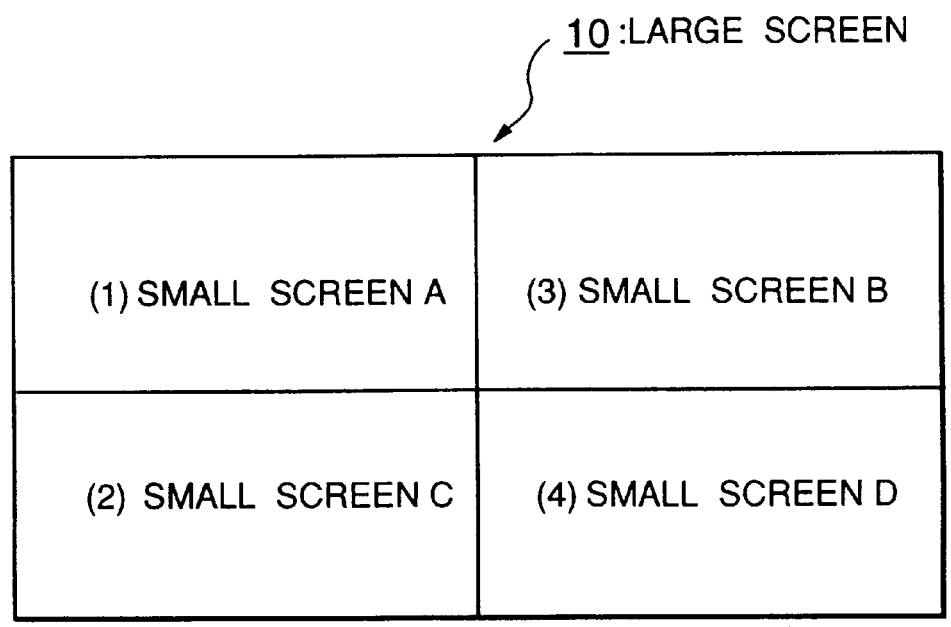
FIG. 3 shows an example of large screen corresponding to a composition of a plurality of small screens.
Figure 5:
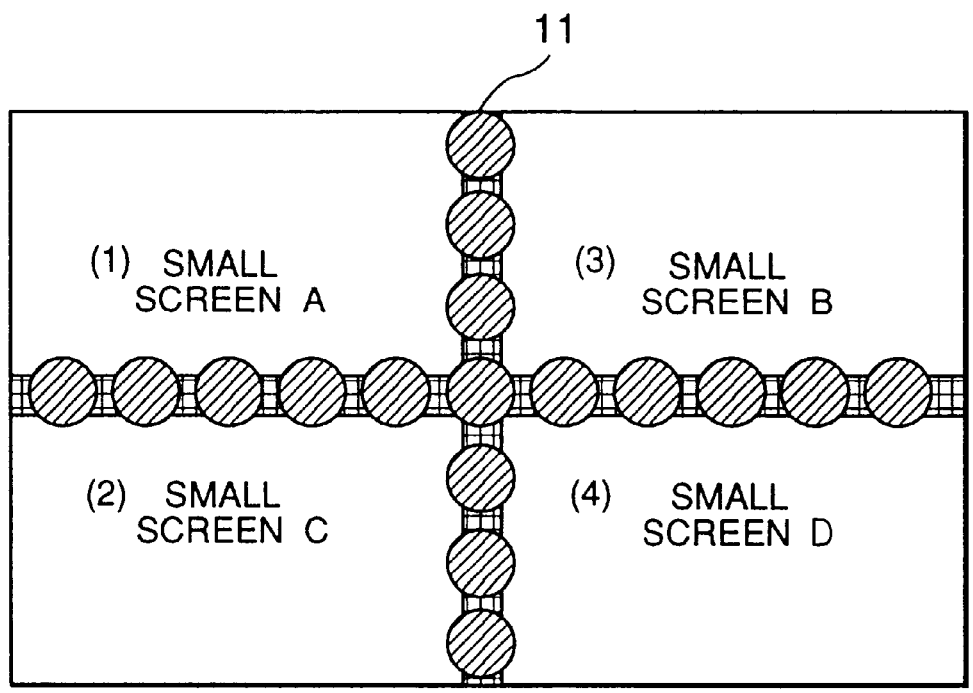
FIG. 5 shows another example of large screen corresponding to a composition of a plurality of small screens.
Figure 6:
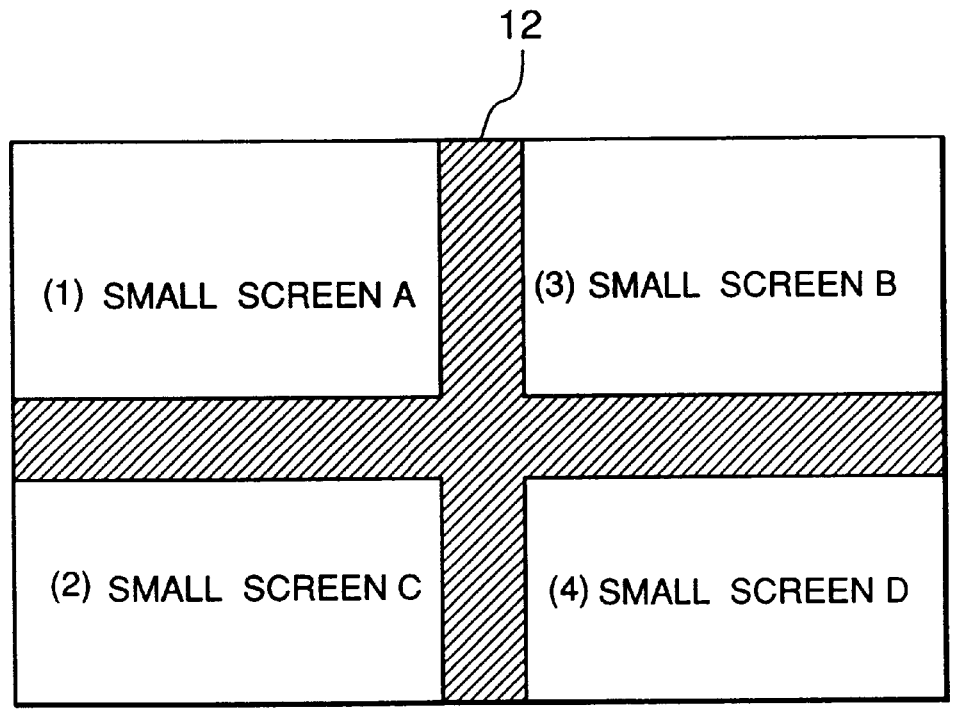
FIG. 6 shows a further example of large screen corresponding to a composition of a plurality of small screens.
Figure 7:
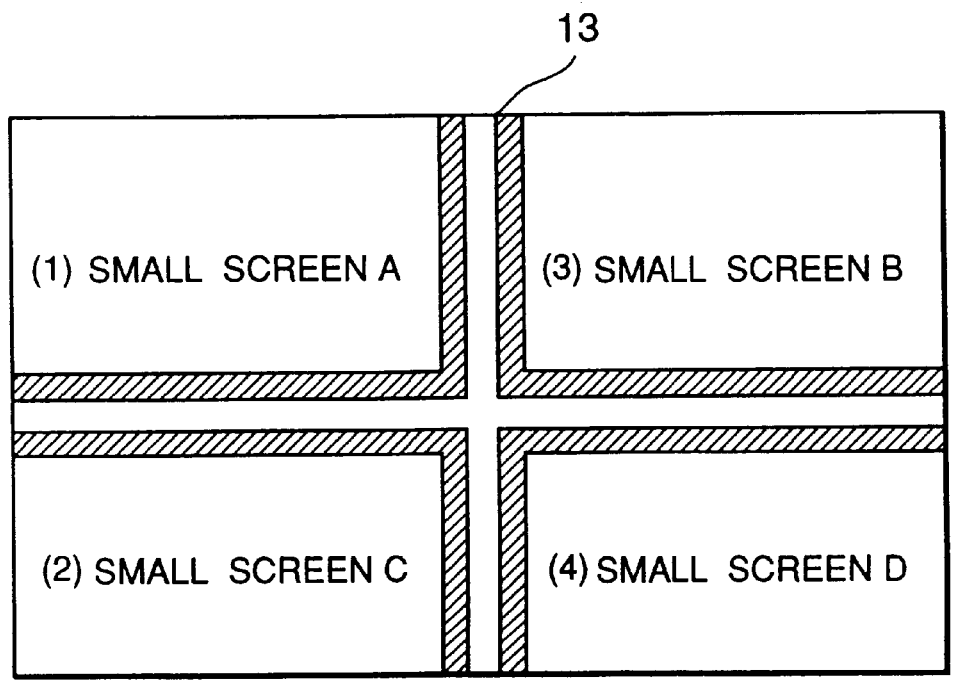
FIG. 7 shows yet another example of large screen corresponding to a composition of a plurality of small screens.

The image multiplexer (MUX) 2 composes the small screen moving image signals a, b, . . . received from the TV cameras 1a, 1b, . . . , arranges these small screen moving image signals of small screens A to D to generate a large screen moving image signal of a large screen 10, and outputs the large screen moving image signal to the large screen encoder (ENC-L) 3, as shown in FIG. 3. On the large screen 10, the small screens A and B, and C and D are arranged respectively in a left/right positional relation, while the small screens A and C, and B and D are arranged respectively in an upper/lower positional relation. For convenience of the compressing and encoding operations of the compressor/encoder 3 on a block basis and the separating and converting operations of the separator/converter 4, the image multiplexer 2 is designed to produce such a large screen 10 as to have boundary zones having a high contrast to clearly distinguish the adjacent small screens by proper widths at the boundaries of the small screens A to D or at the boundaries of blocks during the compression and encoding, as shown in FIGS. 5 to 7.

The large screen encoder (ENC-L) 3 subjects the large screen moving image signal received from the image multiplexer 2 to compressing and encoding operations to generate a large screen compressed/coded data sequence for its output. Employed as this compressing/encoding method is a block coding method for dividing the entire display screen into small blocks and subjecting these blocks to compressing and encoding operations. This block coding method can employ a suitable standard coding method such as, e.g., JPEG (ISO/IEC standard IS 10918-1), MPEG-1 (ISO/IEC standard IS 11172-2), MPEG-2 (ISO/IEC standard DIS 13818-2), or ITU-T recommendation H.261. In these methods, real number computation and motion-compensation interframe coding are carried out as in the DCT on a block basis.

The large screen compressed/coded data sequence issued from the large screen encoder 3 is transmitted or accumulated and then applied to the separator/converter (CON) 4.

The separator/converter 4, which does not encode or expand the received large screen compressed/coded data sequence, properly re-arranges the compressed signals of the blocks to generate and output the small screen compressed data sequences A, B, . . . corresponding to the respective small screen moving images.

During the re-arrangement, data addition and/or deletion is carried out based on such a grammar as to be required for the compressed image signal. For example, when such a coding method as to refer to information on adjacent blocks with use of, e.g., differential values of block positions, luminance D.C. components as parameters of the compressing/coding method; the separator/converter 4 partially decodes only data to be referred to, computes and re-encodes values necessary for the decoding of the respective small screens to thereby generate the compressed/coded data sequences of the small screens. Not included in the operation of the separator/converter 4 is the decoding and re-encoding operation of the real number computation in such inverse DCT or DCT as unnecessary for the separation of the image compressed signal and as to result in an error.

In this way, compared to the prior art system, since the present invention eliminates the need for provision of the decoder (DEC) 94 and the plurality of small screen encoders (ENC-S) 9a, 9b, . . . in the prior art and requires only the separator/converter 4 in place of the demultiplexer (DMUX) 95, the present invention can have a small-sized circuit configuration, thus facilitating the realization of down-sizing of the system.

Figure 4:
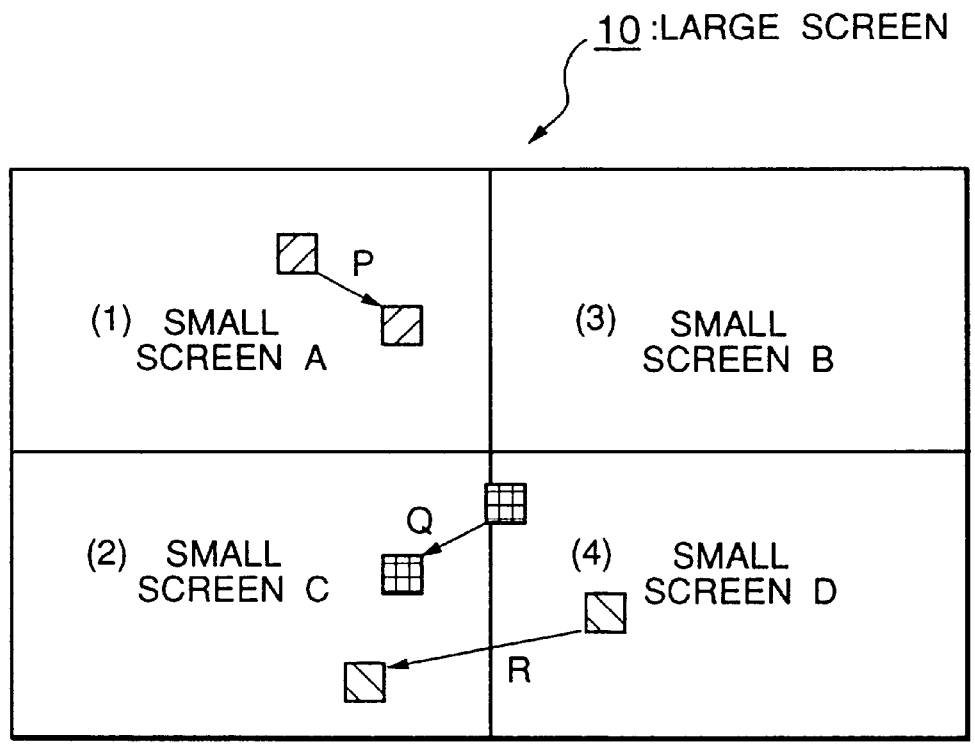
FIG. 4 is a diagram for explaining the operation of a motion-compensation interframe coding method.

Explanation will then be made in connection with a case where the motion-compensation interframe coding method is employed for the moving image compressing and encoding operations of the compressor/encoder (ENC) 3, by referring to FIG. 4.

First of all, with respect to a zone P to be moved within the same small screen A, since the zone to be referred to for preparation of a predictive screen is present within the same screen, even the compressed image signal is separated into its component parts corresponding to the small screens, and it presents no problem. However, with regard to the motion compensation of a zone Q or R moving from the small screen D to the small screen C in the large screen 10, the two adjacent small screens C and D are referred to prepare a predictive screen, so that, when the large screen compressed/ coded data sequence is simply separated into its small screen components, it becomes impossible to prepare the predictive screen for the motion compensation at the time of the decoding operation.

In the illustrated example, such a block motion vector as to require encoding across the adjacent small screens when the zones Q and R are subjected to the motion-compensation interframe coding operation is forcibly set at zero vector. In this way, even when the large screen compressed/coded data sequence is simply separated into its small screen components or small screen compressed/coded data sequences, it is ensured that the respective small screen compressed/coded data sequences can be correctly decoded. That is, the grammatically-correct small screen compressed/coded data sequences can be created.

In the illustrated example, since most of the zones referring to the adjacent small screens are located in the vicinity of the boundaries of the small screens, there may occur a local reduction of image quality at adjacent parts between the adjacent small screens. However, since this image quality reduction is limited to the end parts of the respective small screen moving images, its subjective image quality deterioration will be small.

Explanation will then be made as to how the image multiplexer (MUX) 2 locates zones which contrast with their peripheries is high at boundaries 11 between the small screens A to D, with reference to FIGS. 4 and 5.

When the zones in which contrast with their peripheries is high are located at boundaries 11, an error between a block to be subjected to the predictive compensation and a party block across the boundary including the high-contrast boundaries 11 becomes large. For this reason, in such a system that uses blocks in which mean square error (MSE) or mean absolute error (MAE) is minimum to perform the motion compensation, the frequency of selecting the zones across the boundary is suppressed. As a result, the zone Q adjacent to the boundary line is included in the boundaries 11 as shown in FIG. 4 to thereby suppress generation of the motion compensation of such a zone Q as to refer to the block of the adjacent small screen.

Though the zones such as straight lines and circles have been located at the boundaries 11 in FIG. 5, it will be easily appreciated that zones of any other shape can provide the similar effect to the above so long as the zones are high in contrast.

Further, when the zone refers to a block of the adjacent small screen by a large motion through the boundary line from the small screen D to the small screen C like the zone R having such a motion as shown in FIG. 4, it is impossible to fully suppress generation of such motion compensation across the small screens. However, such a standard coding method as MPEG-1, MPEG-2 or H. 261 sets a motion vector search range, so that there will not occur such a situation that the zone refers to a far block beyond the range. Accordingly, when such motion compensation of the zone R as shown in FIG. 4 takes place, the generation of the motion compensation of the zone R can be easily suppressed by narrowing the motion vector search range of the compressor/encoder or by making large the zone area of the high-contrast boundaries 11.

Next, explanation will be made in connection with FIG. 6. In FIG. 6, in place of the boundaries 11 in FIG. 5, boundaries 12 are provided in the form of lines having a predetermined width and a monochromic color different from the original small screens. More in detail, in the case where the background positioned at peripheral ends of the respective small screens A to D is made up of a screen as relatively simple as bright or dark, for the purpose of strengthening the contrast with the peripheral screens, the boundaries 12 are made in the form of lines black or a dark color close to black when the peripheral images are obviously bright; whereas the boundaries are made in the form of lines white or a bright color close to white when the peripheral images are obviously dark. In this way, since the boundaries 12 of the small screens A to D are made in the form of lines high in contrast with their peripheries, occurrence of such motion compensation as to refer to the adjacent small screen can be suppressed.

Although the boundaries 12 in the form of the monochromic black color lines high in contrast with the peripheries shown in FIG. 6 are located on the boundary lines between the small screens, it is usually difficult to uniquely or decisively determine the peripheral ends of the moving images of the small screens are always bright or dark.

To solve such a problem, such boundaries 13 as shown in FIG. 7 are used.

The boundaries 13 shown in FIG. 7 are made in the form of a plurality of high-contrast, latticed lines in place of the monochromic solid lines in FIG. 6. More specifically, the boundaries 13 are made up of a combination of white lines arranged on the boundaries and black lines having such a shape as to surround the outside of the white lines and corresponding to the peripheries of the small screens A to D. The color combination may be arbitrarily selected so long as the contrast is high.

When the images adjacent to the boundaries 13 are bright or dark, an error between a block to be subjected to the motion compensation and an adjacent block across the boundary becomes high in either case. However, when such a combination of high-contrast, plural lines as mentioned above is positioned at the boundaries, the frequency at which the motion compensation across the boundaries is generated can be effectively suppressed.

The effectiveness and usefulness of the present invention were tested and examined in connection with tests in which actual image data are applied in the above examples, which test results will be explained.

EXAMPLE 1

This actual experiment was conducted for composition of the small screens having boundaries in the form of such narrow lines as shown in FIG. 4.

In order to enable quantitative evaluation of the system, small screen moving image signals of small screen images each having a pixel number of 352×240 were generated by passing standard images used in a test model MPEG-2 through low-pass filters and down-sampling them. In this case, the small screens were "mobile & calendar", "cheer leaders", "flower garden" and "carousel".

Subsequently, the 4 small screen moving images each having the pixel number of 352×240 were composed by the image multiplexer 2 into a large screen moving image having a pixel number of 704×480. The obtained large screen moving image was subjected by the compressor/encoder 3 to compressing and encoding operations with use of an image compressing/coding method based on MPEG-2 (ISO/IEC DIS 13818-2) to generate a bit stream of MPEG-2 compressed/encoded image data sequence signal. Upon the MPEG-2 encoding, limitations of (1) frame structure, (2) frame prediction and (3) linear quantization were placed. The limitations were for the purpose of allowing the separator/converter 4 to easily decode the signals of the small screens separated on a block basis according to the MPEG-1 (ISO/IEC IS 11172-2) image compressing method. It goes without saying that, when MPEG-2 is employed as the method for encoding and compressing the small screen moving images, the above limitations can become unnecessary.

Also used as set parameters upon the MPEG-2 coding are the number N of groups of pictures=15 and a distance M between I and P pictures=3.

The MPEG-2 large screen compressed/coded data sequence thus generated was converted and separated by a converter/separator formed on a workstation into 4 MPEG-1 compressed image signals.

The converter/separator performed such conversion as follows. That is, the converter/separator converted the data of the sequence layer of the MPEG compressed image signal as well as the data of GOP and picture layers into data corresponding to the respective small screen moving images, took in data on zones smaller than macro blocks, and then assigned the data to the respective small screens. Upon the above conversion, the following operations (1), (2) and (3) which follow were carried out.

(1) Transform, addition or deletion of data representation due to differences in grammar between the MPEG-1 and MPEG-2.

(2) Re-naming of the address number of a macro block.

(3) Computation of absolute values of D.C. components in each block and then encoding thereof.

However, the decoding of each block based on the inverse DCT and the re-encoding thereof based on the DCT were not carried out. Further, when there occurred such a motion vector as to refer to the adjacent small screen, the value of such a motion vector was forcibly set at "0".

In such screen composition as shown in FIG. 3, the 4 MPEG-1 bit streams thus obtained was able to be decoded by an MPEG-1 decoder without any grammatical error. Though local image quality reduction was observed at the peripheral ends of some of the small screen images due to the reference range departure of the motion vector, a drop in the S/N ratio of the small screens was able to keep at such a low level as about 1 to 3 dB, compared to the image quality reduction upon the MPEG-2 encoding. The local image quality reduction at the peripheral ends was subjectively as very low as unnoticeable, when compared with the S/N ratio reduction in the central part of the small screen.

EXAMPLE 2

This experiment was conducted for composition of the small screens having boundaries in the form of such high-contrast lines made of straight lines and circles as shown in FIG. 5.

How to prepare small screen moving images is the same as in the above Example 1, except that the high-contrast boundaries are made up of straight lines and circles. Zones surrounded by the straight lines were set to have a width corresponding to a pixel number of 4 and to have a gray color close to white, while the circles were positioned on the gray lines to have a diameter corresponding to a pixel number of 10 and to have a distance between the centers of the adjacent circles corresponding to a pixel number of 16. A large screen thus composed was subjected to the MPEG-2 encoding operation to generate a compressed signal and a bit stream of the compressed signal was subjected to the separation and conversion, in the same manner as in the Example 1.

In the adjacent small screen C to which reference was made most frequently in the Example 1, the number of motion vectors departed from its reference range was a total of 231 between frames 0 to 30. In contrast to it, the number of motion vectors departed from its reference range was reduced to a total of 65 in the Example 2.

Similarly, local image quality reduction upon the decoding of the separated/converted bit streams based on MPEG-1 also dropped. When compared to the image quality reduction upon the MPEG-2 encoding, the S/N ratio reduction of the small screen C was 1.5 dB on the average and that of the other small screens other than the small screen C was able to be suppressed to 0.2–1.0 dB.

EXAMPLE 3

This experiment was conducted for composition of the small screens having boundaries in the form of high-contrast, monochromic-color lines as shown in FIG. 6.

The Example 3 is the same as the above Examples 1 and 2, in the preparation of small screen moving images, the MPEG-2 coding of a large screen moving image and the separation/conversion of a bit stream of compressed signal.

Black lines having a width corresponding to a pixel number of 6 were positioned at the boundaries of the small screens. MPEG-1 bit streams of the small screens obtained through the MPEG-2 encoding and then the separation/conversion were decoded. As a result, with respect to the less effective small screens A and C, a significant improvement was not able to be obtained compared to the Example 1; whereas, with respect to the more effective (due to the black line array) small screens B and D, an improvement in the S/N ratio by 1–2 dB was observed compared to the Example 1. This is because the peripheral ends of the images of the small screens B and D are brighter than those of the small screens A and C, so that the contrast between the black lines and their peripheral images becomes higher and the reference range departure suppressing effect caused by the black line array works more effectively.

EXAMPLE 4

Finally, this experiment was conducted for composition of the small screens having boundaries in the form of high-contrast, monochromic-color lines of different types as shown in FIG. 7.

The Example 4 is the same as the above Examples 1 to 3 in the preparation of small screen moving images, the MPEG-2 encoding of a large screen moving image, and the separation/conversion of a bit stream of compressed signal.

In the Example 4, white lines having a width corresponding to a pixel number of 4 were positioned inside of the boundaries of the small screens, and black lines having a width corresponding to a pixel number of 6 were positioned outside of the boundaries thereof. MPEG-1 bit streams of the small screens obtained through the MPEG-2 encoding and then the separation/conversion of the bit stream of compressed signal were decoded. When compared to the S/N ratio upon the MPEG-2 encoding in the Example 1, the small screen C was the worst in the S/N ratio. In the Example, 4, however, the small screen C was improved in S/N ratio by about 3 dB, while S/N ratio reduction of all the other small screens were also able to be reduced to 1 dB or less when compared to the S/N ratio upon the MPEG-2 encoding.

As has been explained in the foregoing, in accordance with the present invention, there is provided an image code transform system which can eliminate the need for providing a decoder for the large screen compressed/coded data sequence, can remove the re-coding leading to an error, and can facilitate separation of small screen compressed/coded data.

While the present invention has been described in connection with the preferred embodiment, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. An image code transform system for arranging and composing a plurality of small screens of moving images to a large screen image, compressing and encoding the large screen image to generate a large screen compressed/coded data sequence, and extracting small screen compressed/coded data sequences of the plurality of small screens of moving images from the large screen compressed/coded data sequence, comprising:

a multiplexer for re-arranging frames of the plurality of small screen moving images at an identical time to generate a composite frame and generating a large screen moving image signal of the composite frame;

a compressor/encoder for compressing and encoding said large screen moving image signal on a block basis to generate a large screen compressed/coded data sequence signal and for outputting said large screen compressed/coded data sequence signal, said block being obtained by dividing the large screen moving image signal; and a separator/convertor for separating and converting a plurality of small screen compressed signals corresponding to said plurality of small screens directly from the large screen compressed/coded data sequence, wherein said compressor/encoder uses a motion-compensation interframe encoding method to compress and encode said block, and wherein, in the case that said small screen corresponding to a block under compression and encoding is different from said small screen corresponding to another block which is referenced according to a motion vector, said compressor/encoder narrows a search range of the motion vector.

2. A system as set forth in claim 1, wherein said compressor/encoder uses a motion-compensation interframe encoding method to compress and encode said block, and wherein in the case that said small screen corresponding to a block under compression and encoding is different from said small screen corresponding to another block which is referenced according to a motion vector, said compressor/encoder forcibly sets a value of the motion vector at zero.

3. A system as set forth in claim 1, wherein said multiplexer arranges frames of moving images of the plurality of small screens, places a high-contrast signal pattern at boundaries of the small screens on said block basis to generate said large screen image, and outputs the large screen image to said compressor/encoder.

4. A system as set forth in claim 1, wherein said multiplexer arranges frames of moving images of the plurality of small screens, places either one of white and black lines at boundaries of the small screens on said block basis to generate said large screen image, and outputs the large screen image to said compressor/encoder.

5. A system as set forth in claim 1, wherein said multiplexer arranges frames of moving images of the plurality of small screens, places a pattern of white and black lines at boundaries of the small screens on said block basis to generate said large screen image, and outputs the large screen image to said compressor/encoder.

6. A system as set forth in claim 1, wherein said multiplexer arranges frames of moving images of the plurality of small screens, places a pattern of circles and strips at boundaries of the small screens on said block basis to generate said large screen image, and outputs the large screen image to said compressor/encoder.

7. An image code transform system for arranging and composing a plurality of small screens of moving images to a large screen image, compressing and encoding the large screen image to generate a large screen compressed/coded data sequence, and extracting small screen compressed/coded data sequences of the plurality of small screens of moving images from the large screen compressed/coded data sequence, comprising:

a multiplexer for re-arranging frames of the plurality of small screen moving images at an identical time to generate a composite frame and generating a large screen moving image signal of the composite frame;

a compressor/encoder for compressing and encoding said large screen moving image signal on a block basis to generate a large screen compressed/coded data sequence signal and for outputting said large screen compressed/coded data sequence signal, said block being obtained by dividing the large screen moving image signal; and a separator/convertor for separating and converting a plurality of small screen compressed signals corresponding to said plurality of small screens directly from the large screen compressed/coded data sequence, wherein said separator/converter separates and converts the plurality of small screen compressed signals directly from the large screen compressed/coded data sequence signal without encoding large screen compressed/coded data that is included in the large screen compressed/coded data sequence signal.

* * * * *